US008488036B2

(12) United States Patent
Panicacci

(10) Patent No.: US 8,488,036 B2
(45) Date of Patent: Jul. 16, 2013

(54) METHOD AND APPARATUS PROVIDING PIXEL STORAGE GATE CHARGE SENSING FOR ELECTRONIC STABILIZATION IN IMAGERS

(75) Inventor: Roger Panicacci, San Clemente, CA (US)

(73) Assignee: Micron Technology, Inc., Boise, ID (US)

( * ) Notice: Subject to any disclaimer, the term of this patent is extended or adjusted under 35 U.S.C. 154(b) by 161 days.

(21) Appl. No.: 13/092,215

(22) Filed: Apr. 22, 2011

(65) Prior Publication Data

US 2011/0199525 A1 Aug. 18, 2011

Related U.S. Application Data

(63) Continuation of application No. 12/608,072, filed on Oct. 29, 2009, now Pat. No. 7,965,330, which is a continuation of application No. 11/331,121, filed on Jan. 13, 2006, now Pat. No. 7,626,626.

(51) Int. Cl.
*H04N 5/335* (2011.01)

(52) U.S. Cl.
USPC .......................................................... 348/308

(58) Field of Classification Search
USPC ......... 348/308, 294; 257/290–294; 250/208.1
See application file for complete search history.

(56) References Cited

U.S. PATENT DOCUMENTS

| 4,471,228 A | 9/1984 | Nishizawa et al. |
| 4,573,077 A | 2/1986 | Imai |
| 5,243,666 A | 9/1993 | Hasegawa et al. |
| 5,748,231 A | 5/1998 | Park et al. |
| 5,900,623 A | 5/1999 | Tsang et al. |
| 6,140,630 A | 10/2000 | Rhodes |
| 6,204,524 B1 | 3/2001 | Rhodes |
| 6,215,113 B1 | 4/2001 | Chen et al. |
| 6,310,366 B1 | 10/2001 | Rhodes et al. |
| 6,326,652 B1 | 12/2001 | Rhodes |
| 6,333,205 B1 | 12/2001 | Rhodes |
| 6,376,868 B1 | 4/2002 | Rhodes |
| 6,486,503 B1 | 11/2002 | Fossum |
| 6,501,506 B1 | 12/2002 | Miura |
| 6,809,758 B1 | 10/2004 | Jones |
| 6,885,396 B1 | 4/2005 | Panicacci et al. |
| 7,085,637 B2 | 8/2006 | Breed et al. |
| 7,514,716 B2 | 4/2009 | Panicacci |

(Continued)

FOREIGN PATENT DOCUMENTS

| EP | 0 626 785 A2 | 11/1994 |
| EP | 0 626 785 A3 | 11/1994 |

(Continued)

OTHER PUBLICATIONS

Jeong-A Im, et al., "Digital Video Stabilization Algorithm for CMOS Image Sensor", 2006 IEEE.

*Primary Examiner* — Tuan Ho

(74) *Attorney, Agent, or Firm* — Dickstein Shapiro LLP

(57) ABSTRACT

An imaging device that stores charge from a photosensor under at least one storage gate. A driver used to operate the at least one storage gate, senses how much charge was transferred to the storage gate. The sensed charge is used to obtain at least one signature of the image scene. The at least one signature may then be used for processing such as e.g., motion detection, auto-exposure, and auto-white balancing.

15 Claims, 10 Drawing Sheets

U.S. PATENT DOCUMENTS

| | | |
|---|---|---|
| 2004/0001147 A1 | 1/2004 | Vella et al. |
| 2004/0100560 A1 | 5/2004 | Stavely et al. |
| 2005/0179784 A1 | 8/2005 | Qi |
| 2006/0023097 A1* | 2/2006 | Watanabe ............ 348/308 |
| 2006/0146161 A1 | 7/2006 | Farrier |
| 2006/0157759 A1 | 7/2006 | Okita et al. |
| 2006/0181627 A1 | 8/2006 | Farrier |
| 2007/0165123 A1 | 7/2007 | Panicacci |
| 2010/0026868 A1 | 2/2010 | Pertsel et al. |

FOREIGN PATENT DOCUMENTS

| | | |
|---|---|---|
| EP | 0 630 152 A2 | 12/1994 |
| EP | 0 630 152 A3 | 12/1994 |
| JP | 63-070453 | 3/1988 |
| JP | 06-339079 | 12/1994 |
| JP | 11-205689 | 7/1999 |
| JP | 2001-078098 | 3/2001 |
| JP | 2001-119627 | 4/2001 |
| JP | 2003-110939 | 4/2003 |
| JP | 2004-015291 | 1/2004 |
| JP | 2004-356681 | 12/2004 |
| WO | WO 99/54912 | 10/1999 |
| WO | WO 00/05874 | 2/2000 |
| WO | WO 2006/124237 A2 | 11/2006 |
| WO | WO 2007/081743 A2 | 7/2007 |

* cited by examiner

METHOD AND APPARATUS PROVIDING PIXEL STORAGE GATE CHARGE SENSING FOR ELECTRONIC STABILIZATION IN IMAGERS

This application is a continuation of application Ser. No. 12/608,072, filed Oct. 29, 2009, which is a continuation of application Ser. No. 11/331,121, filed Jan. 13, 2006, now U.S. Pat. No. 7,626,626, which are hereby incorporated by reference in their entireties.

FIELD OF THE INVENTION

The invention relates generally to imaging devices and more particularly to circuits and sensor architecture for electronic stabilization in imaging device.

BACKGROUND

A CMOS imager circuit includes a focal plane array of pixel cells, each one of the cells including a photosensor, for example, a photogate, photoconductor or a photodiode overlying a substrate for accumulating photo-generated charge in the underlying portion of the substrate. Each pixel cell has a readout circuit that includes at least an output field effect transistor formed in the substrate and a charge storage region formed on the substrate connected to the gate of an output transistor. The charge storage region may be constructed as a floating diffusion region. Each pixel may include at least one electronic device such as a transistor for transferring charge from the photosensor to the storage region and one device, also typically a transistor, for resetting the storage region to a predetermined charge level prior to charge transference.

In a CMOS imager, the active elements of a pixel cell perform the necessary functions of: (1) photon to charge conversion; (2) accumulation of image charge; (3) resetting the storage region to a known state before the transfer of charge to it; (4) transfer of charge to the storage region accompanied by charge amplification; (5) selection of a pixel for readout; and (6) output and amplification of a signal representing pixel charge. Photo charge may be amplified when it moves from the initial charge accumulation region to the storage region. The charge at the storage region is typically converted to a pixel output voltage by a source follower output transistor.

CMOS imagers of the type discussed above are generally known as discussed, for example, in U.S. Pat. No. 6,140,630, U.S. Pat. No. 6,376,868, U.S. Pat. No. 6,310,366, U.S. Pat. No. 6,326,652, U.S. Pat. No. 6,204,524 and U.S. Pat. No. 6,333,205, assigned to Micron Technology, Inc., which are hereby incorporated by reference in their entirety.

A typical four transistor (4T) CMOS imager pixel 10 is shown in FIG. 1. The pixel 10 includes a photosensor 12 (e.g., photodiode, photogate, etc.), transfer transistor 14, floating diffusion region FD, reset transistor 16, source follower transistor 18 and row select transistor 20. The photosensor 12 is connected to the floating diffusion region FD by the transfer transistor 14 when the transfer transistor 14 is activated by a transfer gate control signal TX.

The reset transistor 16 is connected between the floating diffusion region FD and an array pixel supply voltage Vaa_pix. A reset control signal RST is used to activate the reset transistor 16, which resets the floating diffusion region FD to the array pixel supply voltage Vaa_pix level as is known in the art.

The source follower transistor 18 has its gate connected to the floating diffusion region FD and is connected between the array pixel supply voltage Vaa_pix and the row select transistor 20. The source follower transistor 18 converts the charge stored at the floating diffusion region FD into an electrical output voltage signal Vout. The row select transistor 20 is controllable by a row select signal SEL for selectively connecting the source follower transistor 18 and its output voltage signal Vout to a column line 22 of a pixel array.

There are a variety of applications that benefit from the ability to sense scene information in the pixel array prior to readout. These applications include e.g., motion estimation to compensate for camera movement (hand jitter), object motion tracking to assist with compressing video streams, auto-exposure, and auto-white balancing. With the ability to track camera movement, digital imager control circuits can adjust the starting position of a readout operation (typically, the array contains additional row and columns to allow a smaller window to be readout to keep the image centered in the frame for electronic stabilization).

Estimating localized motion of objects in the array prior to image readout also allows for video stream compression. This occurs by reading out only the portion of the image that has changed relative to the prior image frame. For long exposures used in the capture of still images, motion blur can be eliminated if the motion is sensed during integration and subframes are discarded while good frame data is being accumulated in the pixel. The motion estimation approach that enables the above functions also allows the detection of the magnitude of signals in the scene, which can be used to predict proper exposure and light temperatures (for a sensor with color filters).

The statistics gathered prior to image readout can be used to adjust the window start location, window size, integration time, and signal gain. The statistics can also be used with digital image processing algorithms to assist image processing functions like motion detection, auto-exposure, and auto-white balancing. Other techniques to perform these operations include: (1) using frame memories and digital image processing to track motion; or (2) incorporating separate motion detectors in the camera (e.g., gyros) to detect camera motion. These techniques, however, are undesirable.

Accordingly, there is a need and desire for a scene sensing technique that gathers image scene statistics usable to e.g., detect motion or process signals faster than prior art techniques and without the need for additional memory or discrete external components.

SUMMARY

The invention provides a scene sensing technique for an imager that gathers image scene statistics usable to e.g., detect motion or process signals faster than prior art techniques and without the need for additional memory or discrete external components.

Various exemplary embodiments of the invention provide an imaging device that stores charge from a photosensor under at least one storage gate. A driver used to operate the at least one storage gate, senses how much charge was transferred to the storage gate. The sensed charge is used to obtain at least one signature of the image scene. The at least one signature may then be used for processing such as e.g., motion detection, auto-exposure, and auto-white balancing.

BRIEF DESCRIPTION OF THE DRAWINGS

The foregoing and other advantages and features of the invention will become more apparent from the detailed description of exemplary embodiments provided below with reference to the accompanying drawings in which.

DETAILED DESCRIPTION

In the following detailed description, reference is made to the accompanying drawings, which are a part of the specification, and in which is shown by way of illustration various embodiments whereby the invention may be practiced. These embodiments are described in sufficient detail to enable those skilled in the art to make and use the invention. It is to be understood that other embodiments may be utilized, and that structural, logical, and electrical changes, as well as changes in the materials used, may be made without departing from the spirit and scope of the present invention.

The term "pixel" refers to a photo-element unit cell containing a photo-conversion device or photosensor and transistors for processing an electrical signal from electromagnetic radiation sensed by the photo-conversion device. The pixels discussed herein are illustrated and described as inventive modifications to four transistor (4T) pixel circuits for the sake of example only. It should be understood that the invention is not limited to a four transistor (4T) pixel, but may be used with other pixel arrangements having fewer (e.g., 3T) or more (e.g., 5T) than four transistors. Although the invention is described herein with reference to the architecture and fabrication of one pixel, it should be understood that this is representative of a plurality of pixels in an array of an imager device. In addition, although the invention is described below with reference to a CMOS imager, the invention has applicability to any solid state imaging device having pixels. The following detailed description is, therefore, not to be taken in a limiting sense, and the scope of the present invention is defined only by the appended claims.

Figure 2:
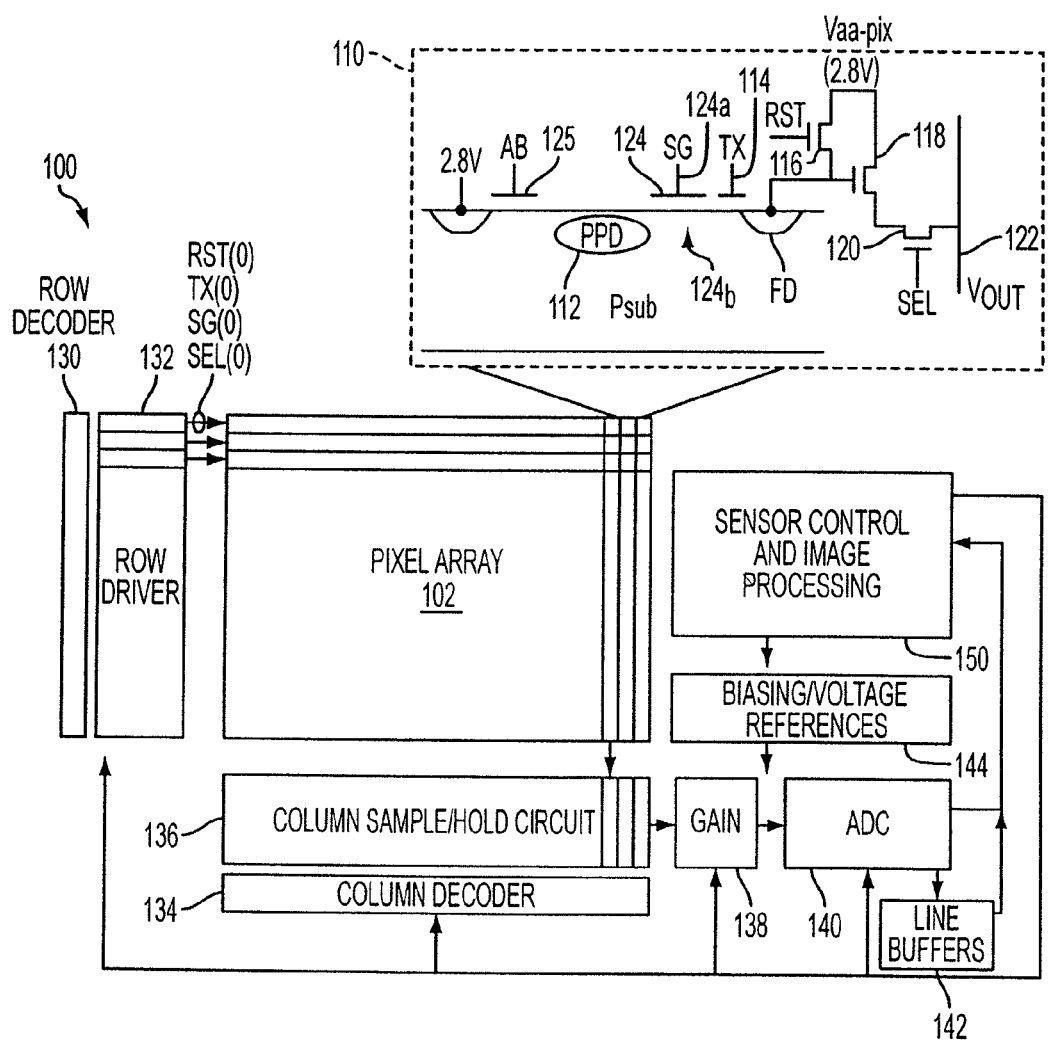
FIG. 2 illustrates a CMOS imager that may utilize the present invention.

Referring to the figures, where like reference numbers designate like elements, FIG. 2 illustrates a CMOS imager 100 that may utilize aspects of the invention. The imager 100 includes a pixel array 102 connected to column sample and hold (S/H) circuitry 136. The pixel array 102 comprises a plurality of pixels 110 arranged in a predetermined number of rows and columns. In operation, the pixels 110 of each row in the array 102 are all turned on at the same time by a row select line e.g., SEL(0) and the pixels 110 of each column are selectively output on a column line 122. A plurality of row and column lines are provided for the entire array 102.

The row lines e.g., SEL(0) are selectively activated by row decoder 130 and driver circuitry 132 in response to an applied row address. Column select lines (not shown) are selectively activated in response to an applied column address by a column circuitry that includes column decoder 134. Thus, row and column addresses are provided for each pixel 110. The CMOS imager 100 is operated by a sensor control and image processing circuit 150, which controls the row and column circuitry for selecting the appropriate row and column lines for pixel readout.

Each column is connected to sampling capacitors and switches in the S/H circuitry 136. A pixel reset signal Vrst and a pixel image signal Vsig for selected pixels are sampled and held by the S/H circuitry 136. A differential signal (Vrst–Vsig) is produced for each pixel by the differential amplifier 138, which applies a gain to the signal received from the S/H circuitry 136. The differential signal is digitized by an analog-to-digital converter 140 (ADC). The analog-to-digital converter 140 supplies the digitized pixel signals to sensor control and image processing circuit 150, which among other things, forms a digital image output. The imager also contains biasing/voltage reference circuitry 144.

Figure 1:
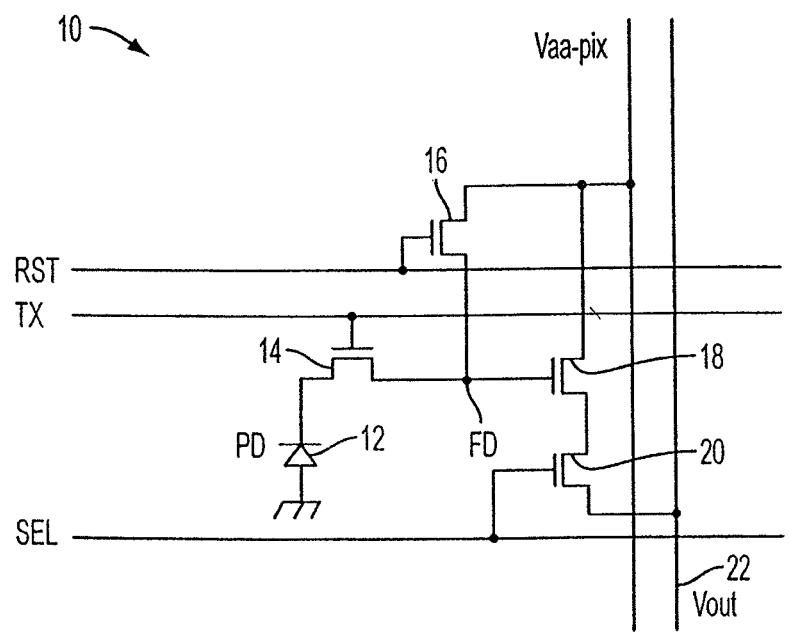
FIG. 1 illustrates a typical four transistor (4T) CMOS imager pixel.

Typical 4T pixels (e.g., pixel 10 of FIG. 1) contain a pinned photodiode photosensor, transfer transistor, and a floating diffusion region to collect charge and sense it. The typical pixel array is readout using a rolling shutter technique, which oftentimes generates image artifacts from having the first and last row of the array collect scene data at different times (typically determined by the readout rate for the rows and the number of rows in the image).

FIG. 2 illustrates a modified pixel 110, which includes a storage gate 124 for storing charge from the photosensor 112 when a storage gate control signal SG is applied to a storage gate control line 124a. FIG. 2 also shows an anti-blooming gate 125, which may be used to drain away excess charge from the photosensor 112 when an anti-blooming gate signal AB is applied. It should be appreciated that the anti-blooming gate 125 is not required to practice the invention.

Figure 3A:
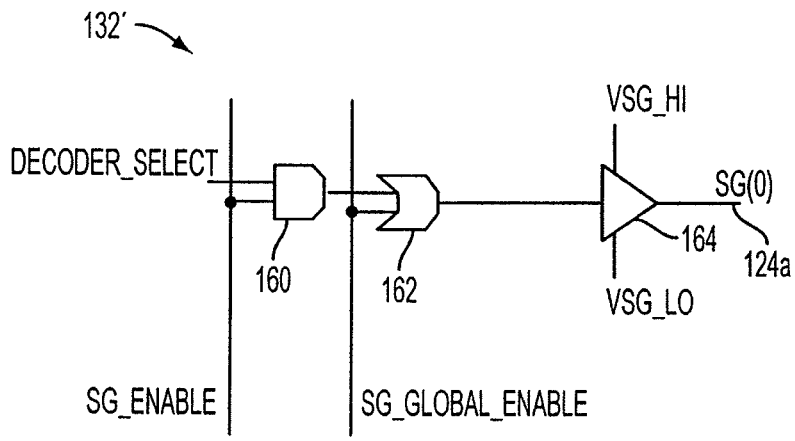
FIG. 3a illustrates one example of a driver portion used in the FIG. 2 imager.

Referring to FIG. 2 and FIG. 3a, the components and operation of a portion 132' of the row driver 132 that is used to drive the SG control signal SG(0) to a first row of pixels 110 in the array 102 are now explained. The driver portion 132' includes an AND gate 160 and OR gate 162 and a line driver 164. It should be appreciated that an imager would include at least one driver portion 132' per row. The driver portions 132' can be activated at the same time to implement an electronic global shutter or they can be activated on a row by row basis when a global shutter is not desired.

An electronic global shutter operation is achieved by inputting a storage gate global enable signal SG_global_enable into the OR gate 162. The output of the OR gate 162 is input into the line driver 164, which drives the SG control signal SG(0) with a high voltage Vsg_hi (e.g., 2.8V) onto the storage gate control line 124a. Otherwise, the line driver 164 drives the SG control signal SG(0) with a low voltage Vsg_lo (e.g., 0V) onto the storage gate control line 124a.

Figure 3B:
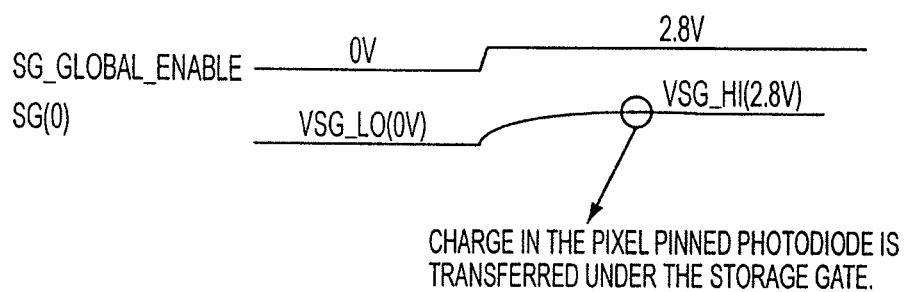
FIG. 3b is an exemplary timing diagram of an operation of the FIG. 3a driver portion.

The AND gate 160 has an input connected to receive a decoder select signal Decoder_select and a storage gate enable signal SG_enable. The use of the Decoder_select and SG_enable signals allows the driver portion 132' to be operated on a row by row basis (rather than as a global shutter) if desired. FIG. 3b illustrates an example timing of the operation of the driver portion 132' for a global shutter operation. As can be seen, charge from the photodiode photosensor 112 is transferred under the storage gate 124 (into channel 124b) after the SG control signal SG(0) is driven with the high voltage Vsg_hi (e.g., 2.8V) onto the storage gate control line 124a.

A first embodiment of the invention utilizes the storage gate 124 and a modified storage gate control signal driver circuit to gather scene information during the global shutter operation from various groups of pixels across the array. Photo-generated electrons captured by the photosensor 112 are transferred under the storage gate 124 at the end of the integration period. The transfer happens by driving a high (e.g., 2.8V) SG control signal onto the storage gate control line 124a. The inventor has determined that because the charge on the storage gate 124 is primarily determined by the charge transferred into the channel 124b below the gate 124, a modified driver portion 132' generating the sensor gate control signal SG could be used to detect how much charge was transferred to the storage gate 124. Accordingly, the invention accurately measures this charge and uses the charge for processing such as e.g., motion detection, auto-exposure, and auto-white balancing.

Figure 4A:
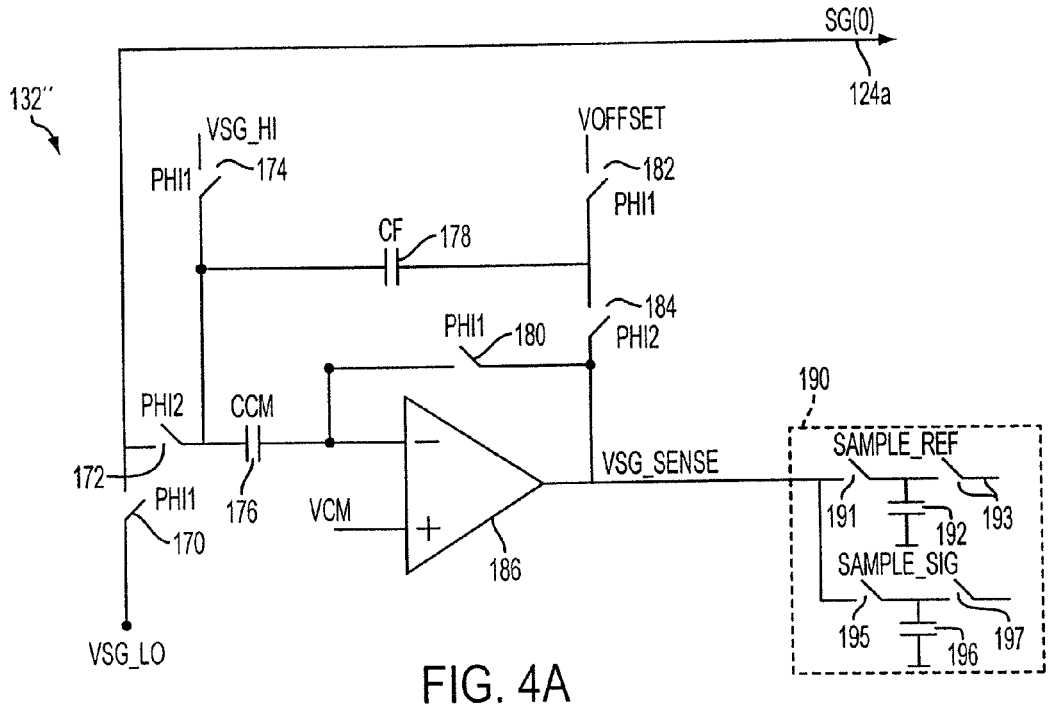
FIG. 4a illustrates an embodiment of a driver portion constructed in accordance with the invention and used in the FIG. 2 imager.
Figure 4B:
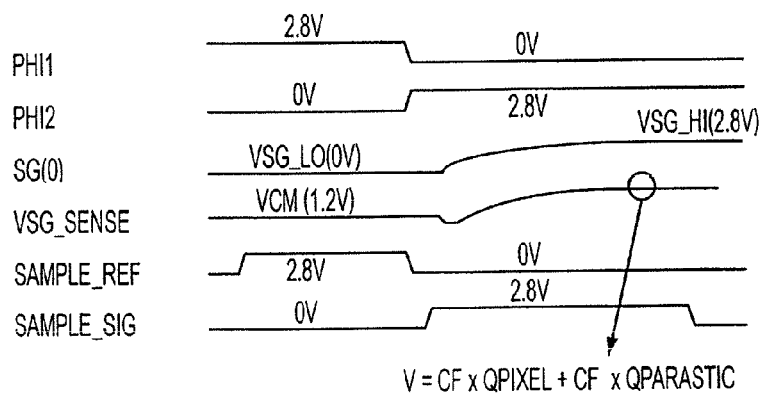
FIG. 4b is an exemplary timing diagram of an operation of the FIG. 4a driver portion.

Referring now to FIGS. 2, 4a and 4b, an exemplary embodiment of the invention is now described. FIG. 4a illustrates a portion 132" of driver 132 (FIG. 2) used to control the storage gate 124. The FIG. 4a driver portion 132" drives the SG control signal e.g., SG(0) onto the storage gate control line 124a and at the same-time senses the amount of charge driven out on the line 124a. Because the storage gate control line 124a is common to all the pixels 110 in the row, the charge sensed by the row driver portion 132" represents the sum of all the photosensor signals in the row.

The driver portion 132" includes switches 170, 172, 174, 180, 182, 184, an input capacitor 176, a feedback capacitor 178, an amplifier 186, and a sample and hold circuit 190. The sample and hold circuit 190 includes two storage capacitors 192, 196 and four switches 191, 193, 195, 197. The feedback capacitor 178 when switched across the amplifier 186 determines the gain of the driver portion 132". The input capacitor 176 at the inverting input of the amplifier 186 decouples DC voltage levels driven out to the storage gate control line 124a and any DC input voltage to ensure that the amplifier 186 works properly. Switches 170, 174, 180 and 182 are controlled by a first signal Phi1. Switches 172 and 184 are controlled by a second signal Phi2. The two signals Phi1, Phi2 may be non overlapping complementary clock signals.

In operation, when the first signal phi1 is active (e.g., 2.8V), switches 170, 174, 180 and 182 are closed. The second signal Phi2 is low, which opens switches 172 and 184. As such, the storage gate control line 124a is driven low with the Vsg_lo voltage (e.g., 0V), the feedback capacitor 178 is reset, and the amplifier 186 is auto-zeroed. The output of the amplifier 186 Vsg_sense will be a reset level (i.e., Vcm or 1.2V), which is stored in capacitor 192 in the sample hold circuit 190 when the sample reference control signal sample_ref closes switch 191. It should be appreciated that switch 193 is used to read out the voltage stored in capacitor 192.

When the second signal phi2 is activated (e.g., 2.8V), switches 172 and 184 are closed. The first signal Phi1 is low, opening switches 170, 174, 180 and 182. As such, the storage gate control line 124a is driven high by the switched-in feedback capacitor 178. The amplifier 186 output Vsg_sense will go high by an amount proportional to the amount of charge required to bring the storage gate control line 124a to the high voltage Vsg_hi. This charge is set by the amount of charge transferred from the photosensor 112 to the SG gate 124 and the amount of parasitic charge required to charge the storage gate control line 124a (shown in FIG. 4b as V=Cf×Qpixel+ Cf×Qparasitic). The amplifier output Vsg_sense is stored in capacitor 196 in the sample hold circuit 190 when the sample signal control signal sample_sig closes switch 195. It should be appreciated that switch 197 is used to read out the voltage stored in capacitor 196.

The output of the driver portion 132" is processed by the normal imager readout circuit path. That is, the output is digitized (by the ADC 140) and stored in a line buffer of a line buffer memory 142 for subsequent processing with the next charge sensing step.

The signal detected by the row driver portion 132" also contains an offset from charging the parasitic capacitance in the line 124a due to metal routing and the storage gate 124 back gate body capacitance. Dark rows in the array 102 can be used to determine the offset, which can be removed using simple switched capacitor circuit techniques. As set forth above, each row in the array 102 is connected to a respective row driver circuit 132". As noted below, the sample and hold circuit 190 does not need to reside in the row circuits if a modification is made to the pixel array 102 to allow a path to the column sample and hold circuits 136 (described below in more detail).

Figure 5:
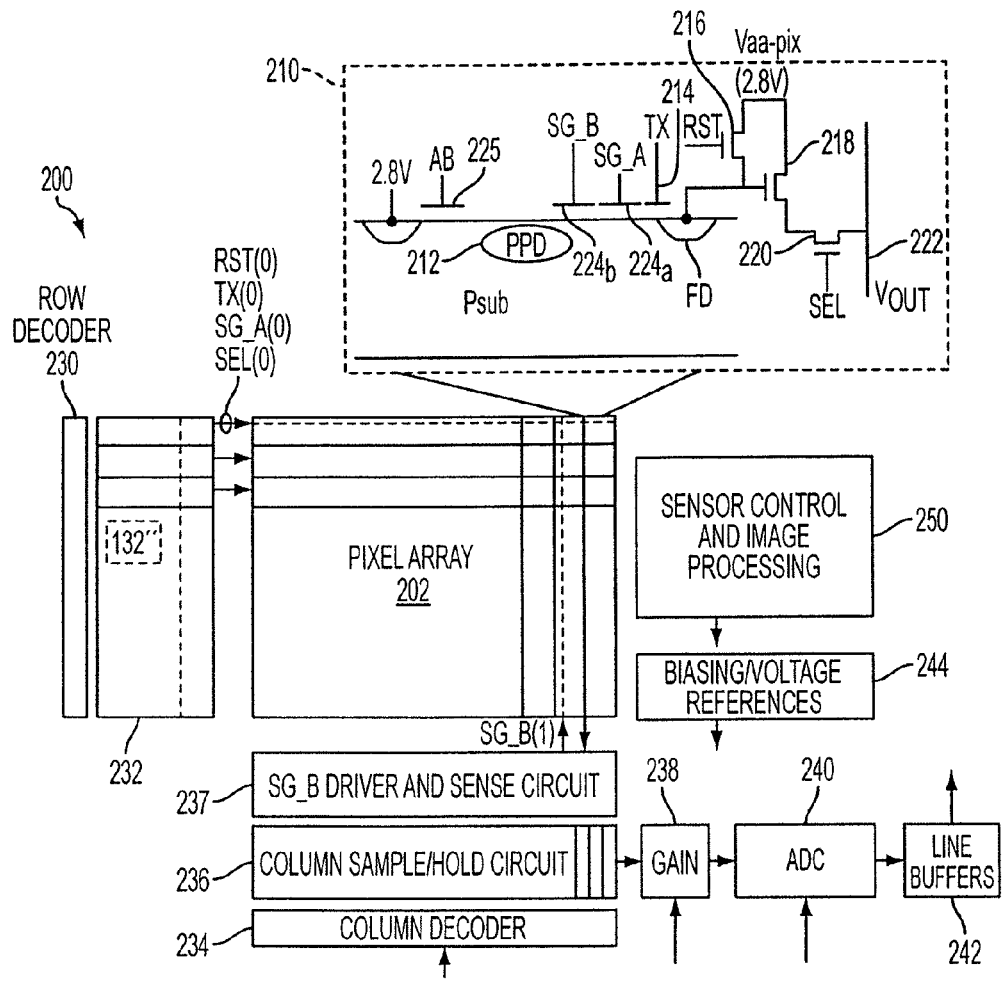
FIG. 5 illustrates a CMOS imager constructed in accordance with an exemplary embodiment of the invention.

FIG. 5 illustrates another exemplary Imager 200 constructed according to the invention. The illustrated imager 200 includes a pixel array 202 comprising a plurality of pixels 210 arranged in a predetermined number of rows and columns. Row lines e.g., SEL(0) connected to the array 202 are selectively activated by row decoder 230 and driver circuitry 232 in response to an applied row address. Column select lines are selectively activated in response to an applied column address by column circuitry including a column decoder 234.

The CMOS imager 200 is operated by a sensor control and image processing circuit 250, which controls the row and column circuitry for selecting the appropriate row and column lines for pixel readout. Each column is connected to sampling capacitors and switches in S/H circuitry 236. A pixel reset signal Vrst and a pixel image signal Vsig for selected pixels are sample and held by the S/H circuitry 236. A differential signal (Vrst-Vsig) is produced for each pixel by the differential amplifier 238, which applies a gain to the signal received from the S/H circuitry 236. The differential signal is digitized by an analog-to-digital converter 240 (ADC). The analog-to-digital converter 240 supplies the digitized pixel signals to sensor control and image processing circuit 250, which among other things, forms a digital image output. The imager also contains biasing/voltage reference circuitry 244.

The imager 200 is different than the FIG. 2 imager 100 in the following ways. In the illustrated embodiment, an additional storage gate 224b is added to each pixel 210 in the array 202. Thus, each pixel 210 comprises a photosensor 212, first storage gate 224a, second storage gate 224b, transfer gate 214, floating diffusion region FD, reset transistor 216 and a row select transistor 220. As with pixel 110 (FIG. 2), an anti-blooming transistor 225 may be used to drain charges away from the photosensor 212 when the AB signal is applied. The additional storage gate 224b is added to the pixel 210 to sense charge across an entire column of pixels 210. As discussed previously, the first storage gate 224a is used to sense charge across an entire row of pixels 210.

Another difference is that the imager 200 requires storage gate driver and sensing circuitry 237 connected to drive the second storage gate control signals SG_B. The driver and sensing circuitry 237 may use the SG driver portion 132" (FIG. 4a) described above. The row driver 232 includes the SG driver and sensing circuitry 132" (FIG. 4a) and is used to drive storage gate control signals SG_A for the first storage gates 224*a* in a row. It should be appreciated that the storage gate driver and sense circuit 237 could be added to the column sample and hold circuitry 236. For column parallel gain architectures the same amplifier used for processing image data may be used for sensing the charge driven to the second SG gates 224*b*.

The output of the storage gate driver and charge sensing circuits needs to be digitized and stored in a line buffer of the line buffer memory 242 for subsequent processing. It should be appreciated that the row storage gate driver and charge sensing circuits are not as easily connected to the existing column-wise readout circuits. In order to re-use these column readout circuits to digitize the row storage gate data, in a desired embodiment, the output of the row storage gate driver and charge sensing circuits 132" should be driven to a floating diffusion region FD in one of the row's pixels and then readout into the column sample and hold circuitry 236.

Figure 6:
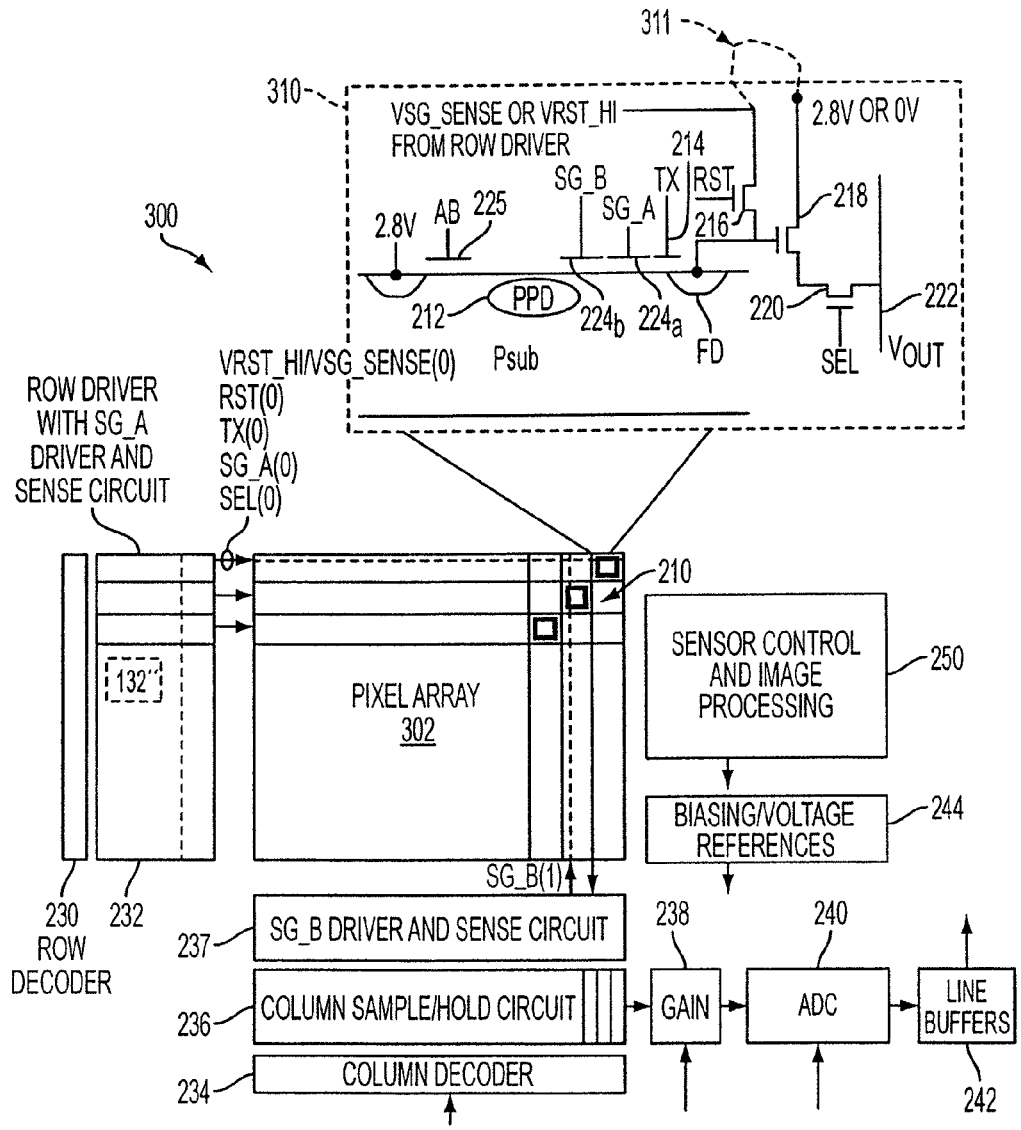
FIG. 6 illustrates another CMOS imager constructed in accordance with an exemplary embodiment of the invention.

FIG. 6 illustrates another embodiment of an imager 300 according to the invention. The imager 300 is essentially the same as the FIG. 5 imager 200 with the following exceptions. The imager 300 utilizes an array 302 having pixels 210 constructed as shown in FIG. 5 where the drain of the pixel reset transistor 216 is normally connected to Vaa-pix (e.g., 2.8V). The array 302 also includes at least one pixel 310 for each row in the array 302. In pixel 310, the drain of the reset transistor 316 must be driven from the row direction rather than vertical column direction to give the row storage gate driver and sense circuitry 132" access to this line. As such, pixels 310 has its reset transistor 316 drain terminal connected to the row driver 232 (via line 311) to generate the path to the column sample hold circuit 236. Because each row driver must deposit a value into the column sample and hold circuitry in parallel, pixels from multiple rows must be enabled to drive the pixel output line 222. All rows in the pixel array 302 are allowed to drive the output line 222 but the floating diffusion regions FD of all rows are set to 0V except for the specially configured pixels 310.

Figure 8:
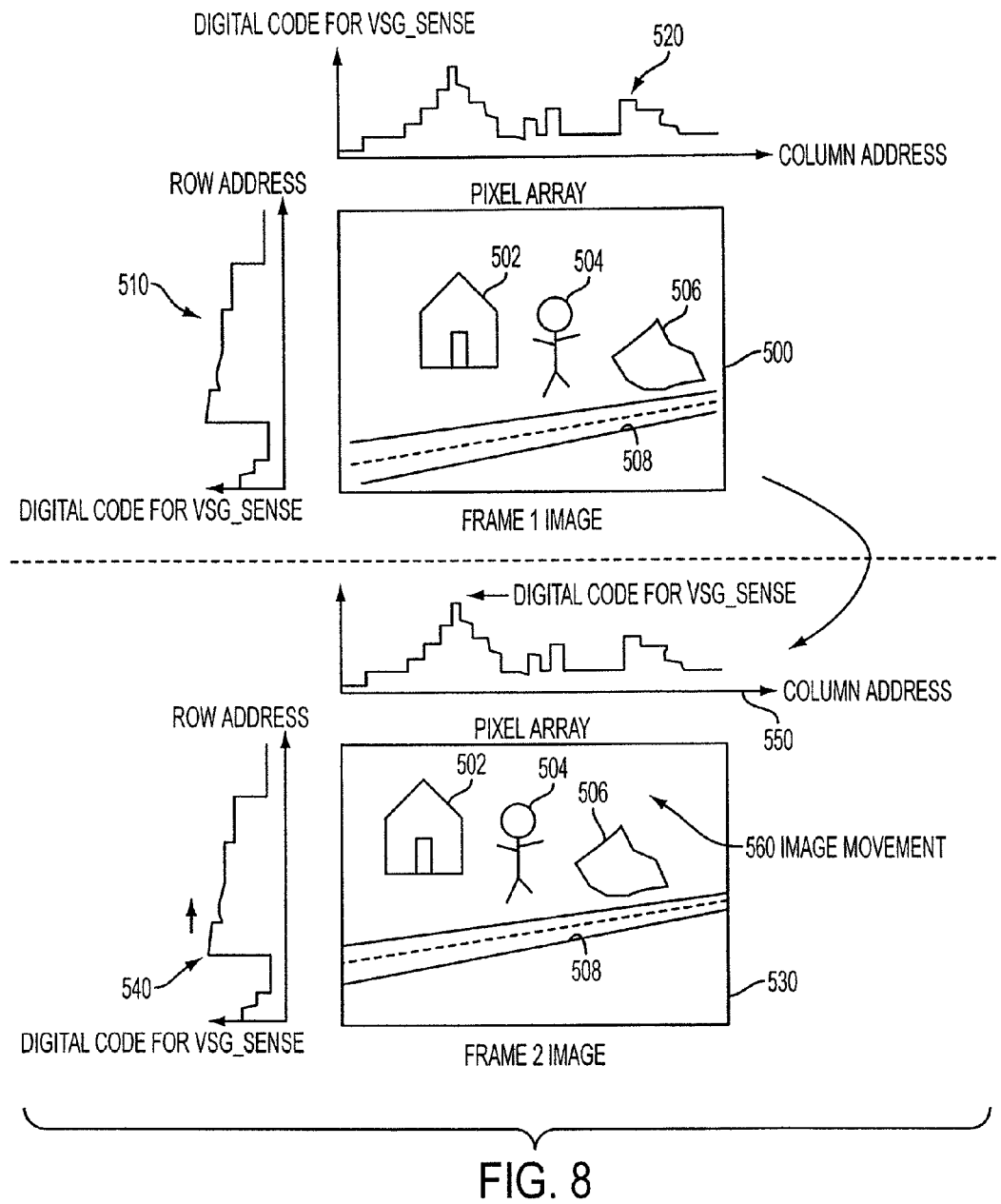
FIG. 8 illustrates exemplary frame images and image signatures used by the invention.

Referring now to FIGS. 6 and 8, digitized data from the row and column storage gate driver and sense circuits 132", 237 are stored in a line buffer memory 242. This data represents a signature 520 indicative of the sum of the pixel values in the x direction and a signature 510 indicative of the sum of the pixel values in the y direction for a particular frame 500. The frame 500 includes objects 502, 504, 506 and 508. The following image frame 530 contains the same objects 502, 504, 506 and 508 but slightly moved when compared to their position in the first frame 500. The direction of the objects' 502, 504, 506 and 508 movement is indicated by arrow 560.

The readout of the storage gate driver and sense circuits 132", 237 sense circuits for the second frame 530 are stored in a second pair of line buffers within buffer memory 242; the difference between the two corresponding line buffers is determined and analyzed. FIG. 8 illustrates signatures 540, 550 for the second frame 530. Digital data in the line buffer is shifted one pixel location at a time, up to N times (e.g., N=32) to find the minimum total difference in values between the two line buffers (i.e., a value at each location in the reference line buffer is compared to the shifted value in the new frame's line buffer and the sum of the differences is generated). The shift with the minimum difference is indicative of how much the image shifted in the direction of the row or column. It should be appreciated, that the invention may utilize a specialized line buffer with logic to enable local calculation of the difference values at each memory word, which would speed up the calculation of the correlation between the signatures. The start address for the image window is adjusted to match the shift in the image to achieve image stabilization. It is expected that a minimum difference threshold should be used to stabilize a frame in the situations where there is too much movement in a scene to accurately predict the motion vector.

The signature and difference information could also be used together with sensor-on-chip (SOC) image processing to reduce the number of required line memories by giving the SOC an estimate of how much motion has occurred in the image. That is, rather than requiring enough line memories to adjust for worst case motion, the number of line memories is reduced according to the accuracy of the analog domain processing.

Figure 7:
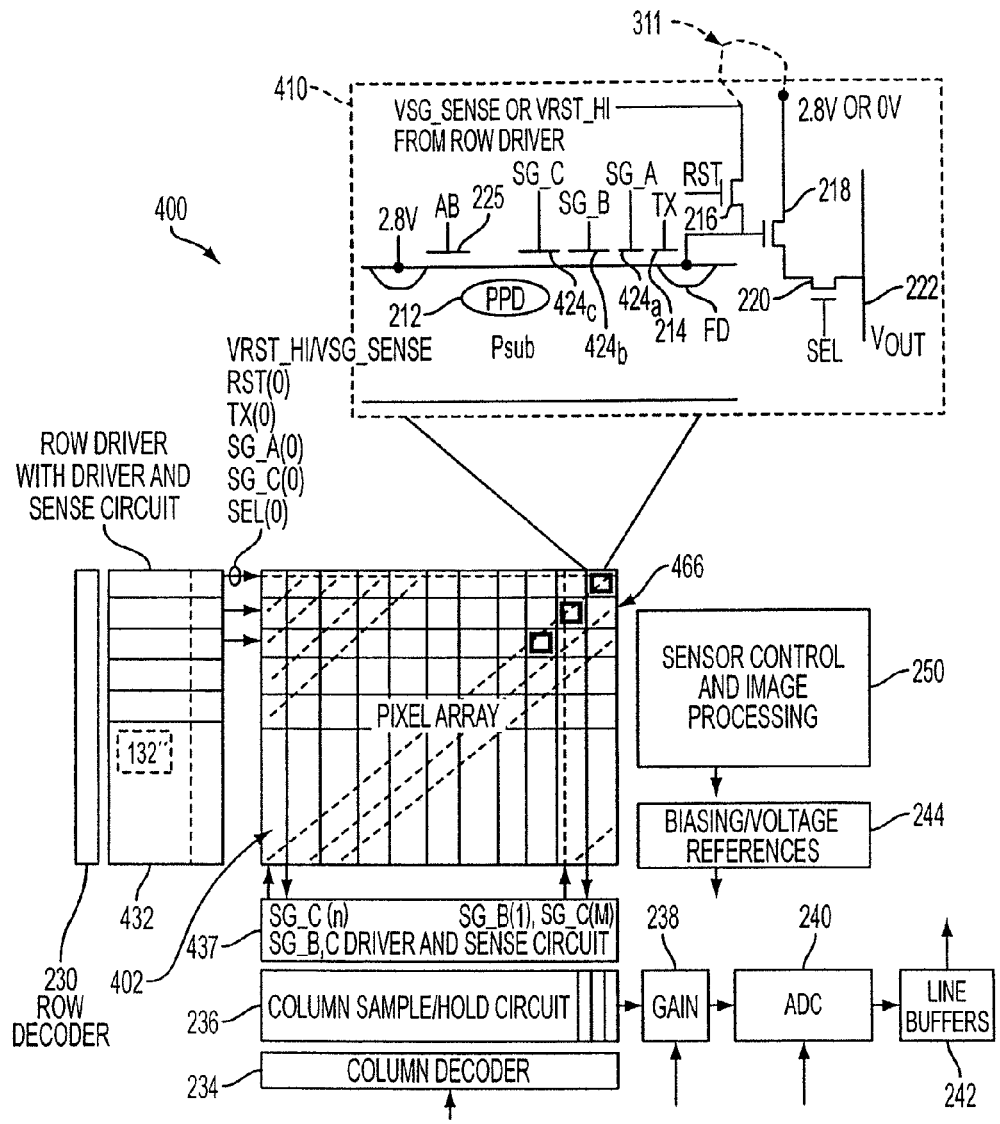
FIG. 7 illustrates another CMOS imager constructed in accordance with an exemplary embodiment of the invention.

FIG. 7 illustrates another imager 400 constructed in accordance with another embodiment of the invention. The imager 400 is essentially the same as the imager 300 of FIG. 6 with the following differences. The imager 400 has a pixel array 402 that utilizes pixels 410 having additional storage gates 424*c* oriented in a diagonal configuration (arrow 466) to obtain more information about the image shift. That is, in pixel 410 three storage gates 424*a*, 424*b*, 424*c* and thus, three directions are checked within a scene to determine if and how an image has shifted. It should be appreciated that a more complex orientation (e.g., serpentine) may be used if desired. To accommodate the additional storage gates, the imager 400 uses additional storage gate driver and sense circuitry within the row driver 432 and the column storage gate driver and sense circuitry 437 to generate the three required storage gate control signals SG_A, SG_B, SG_C.

To find object motion in an image that is not globally stabilized, for example, the motion vector for a frame is first determined. Then, large local differences of values stored in the line buffers 242 can be used to track objects that moved more than the frame jitter movement. In addition, it should be appreciated that the pixels 410 with the additional storage gates could use the same driver circuits used by the other pixels in a multiplexed manner.

The following is an example of the accuracy of the storage gate driver and sense circuits of the invention. For this example, the average storage gate stored charge is 5,000 electrons (assumes a full well is 10,000 electrons), the number of pixels in a row (e.g., for a 2 Meg pixel sensor) is 1600, and the feedback capacitance Cf is 2 pF. The voltage output of the circuit becomes V=Q/C=(5,000×1.6e−19)×1600/2 pF=0.64V. With a 12-bit analog-to-digital converter using a 0.64V reference, each LSB represents 5,000×1600/4096=1953 electrons.

For a pixel with a full well of 10,000 electrons, the storage gate driver and sense circuit can detect about a 20% change in any pixel's value in that row if only that pixel changed. However, other pixels in the row most likely change in value when the image moves across the sensor and it is not possible to determine how many pixels changed in value or the absolute amount for any one pixel. It is expected that a row will still have enough of a unique signature from the signal detected from the sense operation, making it possible to use the value to track the image movement in a particular direction.

For pixels with more charge capacity (or in order to shrink the feedback capacitor in the sense circuit), the transfer operations could happen before the end of the integration time to avoid clipping the signal in the sense circuit. Sub-frame sampling also allows the possibility of detecting motion during long integration times and removing integrated charge that was acquired when there was camera motion. This requires adding a storage gate to the pixel that charge is transferred to if there is no motion (i.e., accumulates charge from multiple sub-frame) and a method to remove charge if there is motion.

One method of removing the charge is to transfer the charge back through the storage gates to the photosensor so it can be removed by activating the anti-blooming gate. Otherwise, a transfer gate must be added to the pixel to allow a path from the storage gates to an electron sink node. Note also that this sensing technique could also be used to determine when proper exposure has been achieved by detecting the amount of accumulated charge during the sub-frames.

It is estimated that there will be an offset in the storage gate sense circuit readout due to charging parasitic capacitance on the storage gate control lines. For example, it is estimated that the parasitic capacitance of the storage gate control line routing for one pixel is approximately 1.2 ff and that the voltage of the routing during the sense operation is approximately 3.0V. Parasitic charge Q is equal to=C×V=1.2 fF×1600× 3V=5.7e−12 Coulombs. The feedback capacitor pre-charge (with the voltage offset Voffset set to 0V)=3V×2 pF=6e−12 Coulombs. The offset at the output of the sense circuit=− 0.24e−12/2 pF=0.12V. This offset can be measured on dark rows in the image and subtracted out by setting the Voffset that sets the pre-charge voltage across the feedback capacitor to the appropriate value.

Figure 9:
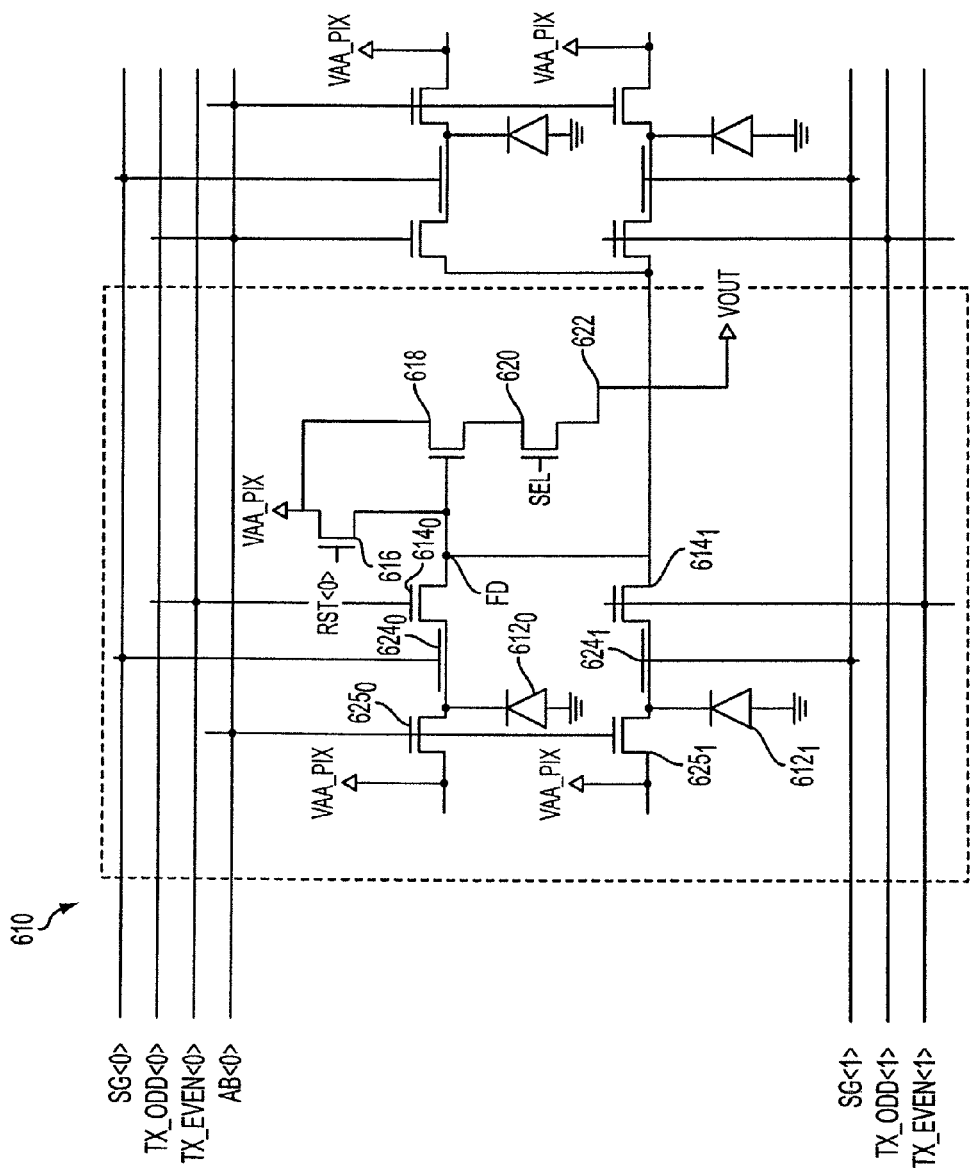
FIG. 9 illustrates an exemplary shared-pixel configuration which can utilize the present invention.

The present invention may also be used in imagers with shared pixel configurations. FIG. 9 illustrates an exemplary shared-pixel 610, which can be used by the present invention. The FIG. 9 configuration and operation of the shared pixel 610 is set forth in U.S. patent application Ser. No. 11/213,936, filed on Aug. 30, 2005, which is hereby incorporated by reference in its entirety.

In the illustrated embodiment, the pixel 610 comprises two photosensors $612_0$, $612_1$, two storage gates $624_0$, $624_1$, two transfer gates $614_0$, $614_1$, a floating diffusion region FD, reset transistor 616 and a row select transistor 620. Anti-blooming transistors $625_0$, $625_1$ may be used to drain charges away from the photosensors $612_0$, $612_1$ when an AB<0> signal is applied. The storage gates $624_0$, $624_1$ are controlled by respective storage gate control signals SG<0>, SG<1>. The pixel 610 is operated in a manner similar to pixel 110 of FIG. 2, with the exception that readout and reset components are shared by two storage gates $624_0$, $624_1$.

For color imagers, the storage gates could be wired separately for each color. Then, the sensed storage gate values would indicate the amount of charge for groups of different colored pixels. Depending on the scene color content and lighting condition, this information could be used for white balance determination.

Thus, the invention uses charge sensing circuitry within row storage gate drivers to detect the amount of charge accumulated in a group of pixels (entire rows, diagonal or arbitrary group configuration) and uses charge signature information for a particular scene to detect the sensor motion amount and direction. Moreover, the invention uses charge sensing circuitry within storage gate drivers inside the column circuitry to detect the amount of charge accumulated in a group of pixels (entire column, diagonal or arbitrary group configuration) and uses signature information for a particular scene to detect the sensor motion amount and direction.

The invention also stores digitized signal signature in line memories for two or more frames and detects a correlation between the signatures to determine the amount/direction of motion. The information is used to determine a new window starting address to remove camera shake in video sequences. In addition, during the imager's integration period, charges from the photosensor may be sampled using the charge sensing circuitry within the row or column drivers to detect motion and subsequently remove or accumulate charge within the pixel to remove motion artifacts during long exposure periods.

The invention may use the sensed signatures to detect frame movement and motion of objects within a frame by looking at the maximum individual difference values between the stored lines of sense information that have strong correlations. The invention may use the existing pixel array readout circuitry to readout the charge sensing circuits to apply gain to the readout amplifier and offsets needed for A/D conversion. The invention may use the signatures for separate storage gates for individual colors to determine proper white balance and may use signature information for the array to determine proper exposure in a non-destructive manner.

It should be appreciated that the invention can be used with the typical 4T pixel 10 (FIG. 1) if desired. Instead of storing charge under a storage gate, charge can be stored and sensed under the transfer gate 14. Accordingly, in this embodiment, a driver would be used to drive and sense the transfer gate control signal TX (as opposed to a storage gate control signal).

Figure 10:
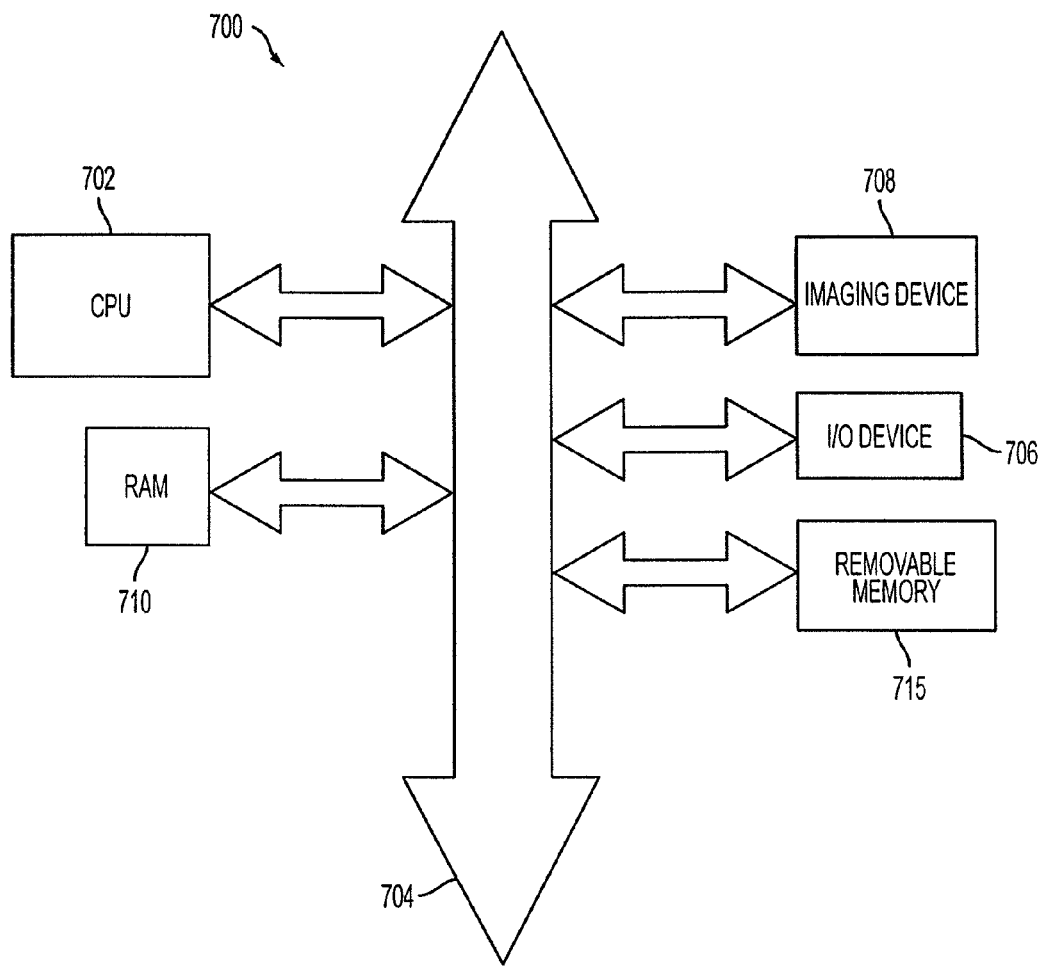
FIG. 10 illustrates a system suitable for use with any one of the embodiments of the invention.

FIG. 10 shows system 700, a typical processor system modified to include an imaging device 708 constructed in accordance with one of the embodiments of the invention. The processor-based system 700 is exemplary of a system having digital circuits that could include image sensor devices. Without being limiting, such a system could include a computer system, camera system, scanner, machine vision, vehicle navigation, video phone, surveillance system, auto focus system, star tracker system, motion detection system, image stabilization system, and data compression system.

System 700, for example a camera system, generally comprises a central processing unit (CPU) 702, such as a microprocessor, that communicates with an input/output (I/O) device 706 over a bus 704. Imaging device 708 also communicates with the CPU 702 over the bus 704. The processor-based system 700 also includes random access memory (RAM) 710, and can include removable memory 715, such as flash memory, which also communicate with the CPU 702 over the bus 704. The imaging device 708 may be combined with a processor, such as a CPU, digital signal processor, or microprocessor, with or without memory storage on a single integrated circuit or on a different chip than the processor. The imaging device 708 may be any one of the imagers 100, 200, 300, 400 constructed in accordance with the invention.

The processes and devices described above illustrate preferred methods and typical devices of many that could be used and produced. The above description and drawings illustrate embodiments, which achieve the objects, features, and advantages of the present invention. However, it is not intended that the present invention be strictly limited to the above-described and illustrated embodiments. Any modification, though presently unforeseeable, of the present invention that comes within the spirit and scope of the following claims should be considered part of the present invention.

What is claimed as new and desired to be protected by Letters Patent of the United States is:

1. An imager pixel comprising:
   a photosensor;
   a first gate for storing charge from said photosensor when activated by a first row control signal; and
   a second gate for storing charge from said photosensor when activated by a second first column control signal.

2. The pixel of claim 1, further comprising a third gate for storing charge from said photosensor when activated by another control signal.

3. A method of operating an imaging device, the imaging device comprising a plurality of pixels, each comprising a photosensor and a first gate, said method comprising the acts of:

for each pixel, sensing first charge stored under the first gate using a first control line used to activate the first gate, the sensed first charge corresponding to a first image scene;

for each pixel, sensing second charge stored under the first gate using the first control line, the sensed second charge corresponding to a second image scene; and detecting motion of at least one object in the first and second image scenes using first and second signatures obtained using the sensed first and second charges.

4. The method of claim 3, wherein the detecting step detects an amount and direction of motion for the at least one object.

5. The method of claim 3, wherein the detecting step detects an amount and direction of motion for the at least one object by computing differences between the first and second signatures.

6. The method of claim 3, wherein each pixel comprises a second gate and said method further comprises the acts of:

for each pixel, sensing third charge stored under the second gate using a second control line used to activate the second gate;

for each pixel, sensing fourth charge stored under the second gate using the second control line; and detecting motion of the at least one object using the first and second signatures and third and fourth signatures obtained from the sensed third and fourth charges.

7. The method of claim 6, wherein a portion of the pixels comprises a third gate and said method further comprises the acts of:

for each pixel comprising the third gate, sensing fifth charge stored under the third gate using a third control line used to activate the third gate;

for each pixel comprising the third gate, sensing sixth charge stored under the third gate using the third control line; and detecting motion of the at least one object using the first, second, third and fourth signatures and fifth and sixth signatures obtained from the sensed fifth and sixth charges.

8. An imaging device comprising:

a plurality of pixels, each pixel comprising a first gate for storing charge from a photosensor;

a plurality of first driver and sense circuits, each first driver and sense circuit being connected to and associated with a respective first set of pixels, each first driver and sense circuit adapted to sense an amount of first and second charge stored under the first gates in the respective first set using the same first control lines used to activate the first gates, the sensed first charge corresponding to a first image scene and the sensed second charge corresponding to a second image scene; and a processor for detecting motion of at least one object in the first and second image scenes using signatures generated from the sensed first and second charges.

9. The imaging device of claim 8, wherein the processor detects an amount and direction of motion for the at least one object.

10. The imaging device of claim 8, wherein the processor detects an amount and direction of motion for the at least one object by computing differences between the signatures.

11. The imaging device of claim 8, wherein each pixel further comprises a second gate for storing charge from the photosensor, and the device further comprises a plurality of second driver and sense circuits, each second driver and sense circuit being connected to and associated with a respective one of the first set of pixels, each second driver and sense circuit adapted to sense an amount of third and fourth charge stored under the second gates in the respective set using the same second control lines used to activate the second gates, and wherein the processor uses the first and second signatures and third and fourth signatures based on the sensed third and fourth charges to detect motion of the at least one object.

12. The imaging device of claim 11, wherein a portion of said pixels further comprises a third gate for storing charge from said photosensor and the device further comprises a plurality of third driver and sense circuits, each third driver and sense circuit being connected to and associated with a respective third gate, each third driver and sense circuit adapted to sense an amount of fifth and sixth charge stored under the third gates in the respective set using the same third control lines used to activate the third gates, and wherein the processor uses the first, second, third and fourth signatures and fifth and sixth signatures based on the sensed fifth and sixth charges to detect motion of the at least one object.

13. The imaging device of claim 12, wherein said third gates are organized as a diagonal pattern across said array.

14. The imaging device of claim 8, wherein the plurality of pixels are organized into an array of rows and columns, each first set of pixels corresponds to a respective row of pixels, and a second set of pixels corresponds to a respective column of pixels.

15. The imaging device of claim 8, wherein each first gate is a transfer gate and each first control signal is a transfer gate control signal.

* * * * *

UNITED STATES PATENT AND TRADEMARK OFFICE
CERTIFICATE OF CORRECTION

PATENT NO. : 8,488,036 B2
APPLICATION NO. : 13/092215
DATED : July 16, 2013
INVENTOR(S) : Roger Panicacci Page 1 of 1

It is certified that error appears in the above-identified patent and that said Letters Patent is hereby corrected as shown below:

In the Claims:

In column 10, line 64, in Claim 1, after "a" delete "second".

Signed and Sealed this
Twenty-ninth Day of October, 2013

Teresa Stanek Rea
*Deputy Director of the United States Patent and Trademark Office*